US006992248B1

(12) United States Patent
Dunbar et al.

(10) Patent No.: US 6,992,248 B1
(45) Date of Patent: Jan. 31, 2006

(54) JUNCTION BOX ASSEMBLY WITH CONNECTIVITY ASSURANCE

(75) Inventors: J. Patrick Dunbar, Westland, MI (US); Joseph Mauney, South Lyon, MI (US)

(73) Assignee: Sumitomo Electric Wiring Systems - Detroit Technical Center, Inc., Dearborn, MI (US)

( * ) Notice: Subject to any disclaimer, the term of this patent is extended or adjusted under 35 U.S.C. 154(b) by 0 days.

(21) Appl. No.: 11/113,093

(22) Filed: Apr. 25, 2005

(51) Int. Cl.
*H02G 3/08* (2006.01)

(52) U.S. Cl. ............................ 174/50; 174/58; 174/63; 248/906

(58) Field of Classification Search .................. 174/50, 174/58, 63, 17 R; 220/3.2, 3.8, 4.02; 439/535, 439/157, 152; 248/906
See application file for complete search history.

(56) References Cited

U.S. PATENT DOCUMENTS 6,359,218 B1 * 3/2002 Koch et al. .................... 174/50
6,541,700 B2 * 4/2003 Chiriku et al. ................ 174/50
6,600,658 B2 * 7/2003 Iwata ......................... 361/752
6,677,521 B2 * 1/2004 Sumida et al. ................ 174/50
6,739,889 B1 * 5/2004 Daggett et al. ............. 439/157
6,870,097 B2 * 3/2005 Oda ............................ 174/50
6,909,047 B2 * 6/2005 Zhang ......................... 174/50
2003/0211764 A1 11/2003 Fukamachi et al.

FOREIGN PATENT DOCUMENTS

JP U 7-39226 7/1995

* cited by examiner

*Primary Examiner*—Dhiru R. Patel
(74) *Attorney, Agent, or Firm*—Oliff & Berridge, PLC

(57) ABSTRACT

A junction box assembly includes a lower cover, a junction box and an upper cover. The junction box holds one or more connectors that mate with corresponding connectors in the lower cover. The junction box includes a locking structure that engages with a corresponding locking structure of the upper cover. The junction box also includes a cover engagement restriction portion. The upper cover includes a lock position assurance device that abuts against the cover engagement restriction portion and restricts the upper cover from engaging the lower cover if the junction box is not properly installed into the lower cover. The lock position assurance device may also restrict accidental disengagement of the junction box from the junction box by restricting the junction box locking structure from disengaging the corresponding locking structure of the upper cover.

7 Claims, 5 Drawing Sheets

JUNCTION BOX ASSEMBLY WITH CONNECTIVITY ASSURANCE

BACKGROUND

This invention relates to a junction box assembly that assures good connectivity between connectable components that are inside and/or part of the junction box assembly.

In the assembly and use of electrical components, it is important that good electrical contact is established between connected electrical components, and that the electrical contact is not accidentally broken during use. Some connectors have locking tabs that snap into engagement to physically lock the connectors to mating connectors when the electrical contact is fully established.

SUMMARY

Locking structures have also been provided on electrical junction boxes and/or components accommodated inside the junction boxes. However, even in junction boxes with such locking structures, there is a chance that electrical contact can be insufficiently established and/or can be broken during use, if, for example, the assembly operator fails to fully connect the junction box parts and/or interior components. This is increasingly a problem as more and more connections are made in junction boxes due, for example, to the demand for more and more electrical features in automobiles. Specifically, for example, as more terminals are contained within a given connector, the force required to push the connector into engagement with a mating connector increases. This increase in required assembly force makes it more likely that the connection will be insufficiently established. Operator fatigue in an assembly line, or simply human error, can be other factors leading to insufficient connection. There is also a possibility that the locking structures can be accidentally disengaged during certain operating conditions of a vehicle in which the junction box is installed.

Insufficient connection and accidental disconnection can lead to warranty and safety problems.

Therefore, an object of this invention is to ensure sufficient connection between components, and/or to provide a visual, audible and/or tactile indication when a connection is not sufficient.

Embodiments of the invention provide a junction box assembly including a lower cover, a junction box and an upper cover. The junction box holds one or more connectors that mate with corresponding connectors in the lower cover. The junction box includes a locking structure that engages with a corresponding locking structure of the upper cover. The junction box also includes a cover engagement restriction portion. The upper cover includes a lock position assurance device that abuts against the cover engagement restriction portion and restricts the upper cover from engaging the lower cover if the junction box is not properly installed into the lower cover.

One or more disconnection restriction portions may be provided on the upper cover, contacting or being closely adjacent to the junction box in a state in which the lower cover, the junction box and the upper cover are fully assembled. The disconnection restriction portions can help restrict accidental disengagement of the junction box from the lower cover.

These and other objects, advantages and salient features of the invention are described in or apparent from the following detailed description of exemplary embodiments.

BRIEF DESCRIPTION OF THE DRAWINGS

Exemplary embodiments of the invention will be described with reference to the drawings, wherein like numerals represent like parts, and wherein.

DETAILED DESCRIPTION OF EMBODIMENTS

Embodiments of this invention can provide the following advantages, separately or in any combination:

(1) Assurance that connection between connectors of a junction box and connectors of a lower cover is complete;

(2) Assurance that the junction box is properly installed in the lower cover; and (3) Restriction of accidental release of the junction box from the lower cover.

Figure 1:
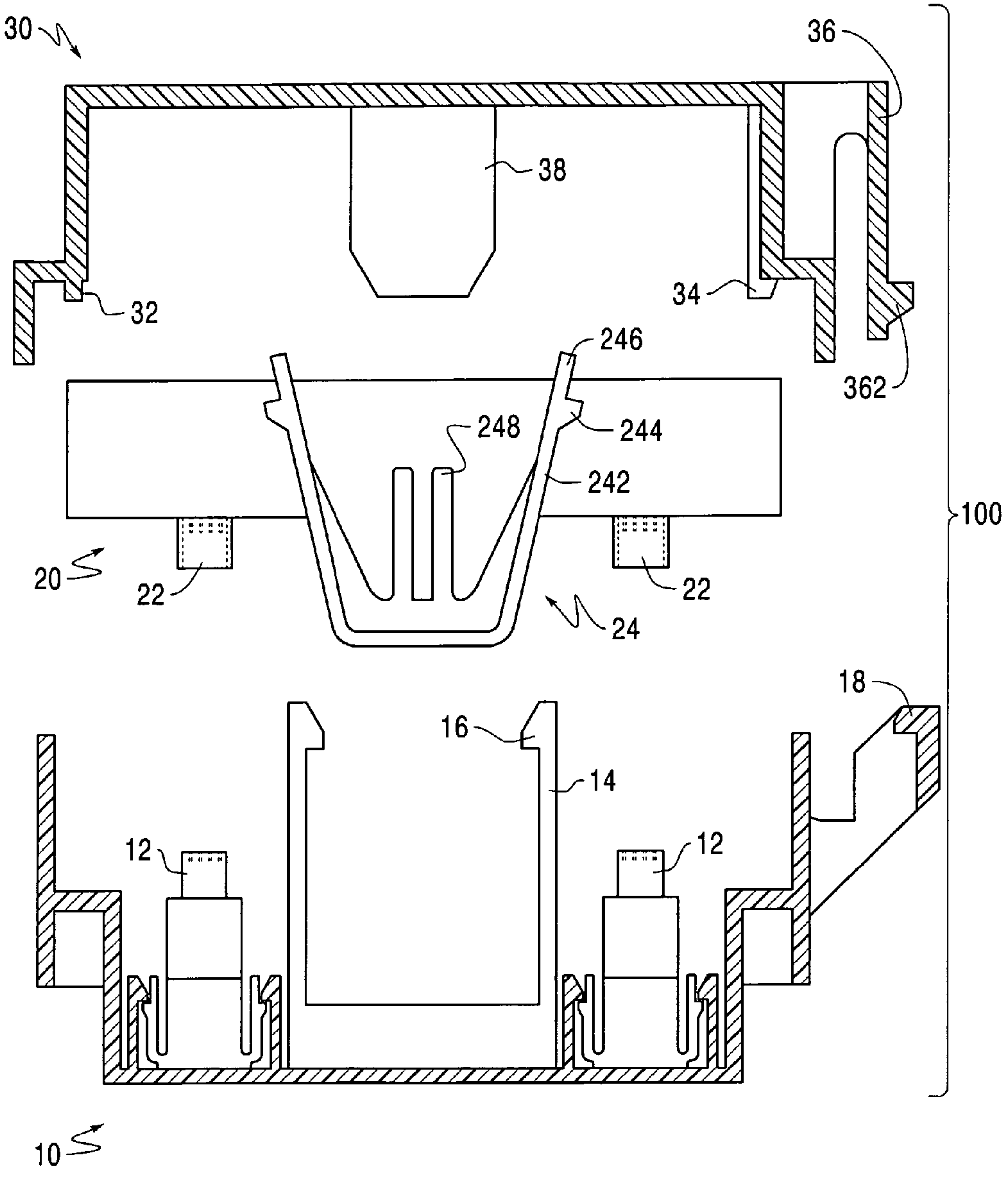
FIG. 1 is an exploded view of a lower cover, a junction box and an upper cover that connect together to form a junction box assembly.

FIG. 1 is an exploded view of a lower cover 10, a junction box 20 and an upper cover 30 that connect together to form a junction box assembly 100. The lower cover 10 accommodates connectors 12, which may, for example, be staged connectors such as are disclosed in related copending U.S. application Publication No. U.S. 2003/0211764 A1, the disclosure of which is incorporated herein by reference in its entirety. The lower cover 10 also has locking arms 14 extending toward an open end of the lower cover 10. The locking arms 14 have locking projections 16 that project inward towards each other. The lower cover 10 also includes a cover locking structure 18.

The locking arms 14 are depicted as having free ends, but the ends may in fact be attached to a sidewall of the lower cover 10 so that the ends do not deflect inward or outward. (The sidewall is removed in the figures for better clarity of the interior components of the lower cover.) Although it is possible to allow the locking arms 14 to have free ends, it is generally preferably to attach the ends to the sidewall, by integral molding, for example, to improve the reliability of the engagement between the lower cover 10 and the junction box 20.

The junction box 20 includes connectors 22 that mate with the connectors 12. At an upper surface of the junction box 20, relays, fuses and/or other electrical devices (not shown) may be installed as appropriate to make various desired connections between terminals of the connectors 22. The junction box 20 also includes a locking structure 24 that engages the locking arms 14 of the lower cover 10. In this embodiment, the locking structure 24 includes locking arms 242 that are connected to the junction box 20 via connection ribs 248. Locking projections 244 project outward from the locking arms 242, and free end portions of the locking arms 242 form cover engagement restriction portions 246.

The upper cover 30 covers and engages the lower cover 10 and the junction box 20. The upper cover 30 may include disconnection restriction portions 32 and 34 that contact or are closely adjacent to the junction box 20 in a state in which the lower cover 10, the junction box 20 and the upper cover 30 are fully assembled. The disconnection restriction portions 32 and 34 may be of any desired or convenient configuration, but in this embodiment, the disconnection restriction portion 32 is in the form of a lip that extends in a direction perpendicular to the plane of the page, and extends substantially along the entire length of a sidewall of the upper cover 30. The disconnection restriction portion 34 is in the form of a rib that is integral with the upper cover 30.

The upper cover 30 also may include a locking arm 36 with a locking projection 362 that engages the cover locking structure 18 of the lower cover 10 when the upper cover 30 is brought into engagement with the lower cover 10. A lock position assurance device 38, hereafter called a tab 38, extends from a wall of the upper cover 30.

Only one locking structure 24, one pair of locking arms 14, and one tab 38 are depicted, but any desired number may be provided. It is generally preferable to have two locking structures 24, provided on opposite sides of the junction box 10, with corresponding tabs 38 provided in the upper cover 30 and corresponding pairs of locking arms 14 provided in the lower cover 10.

Figure 2:
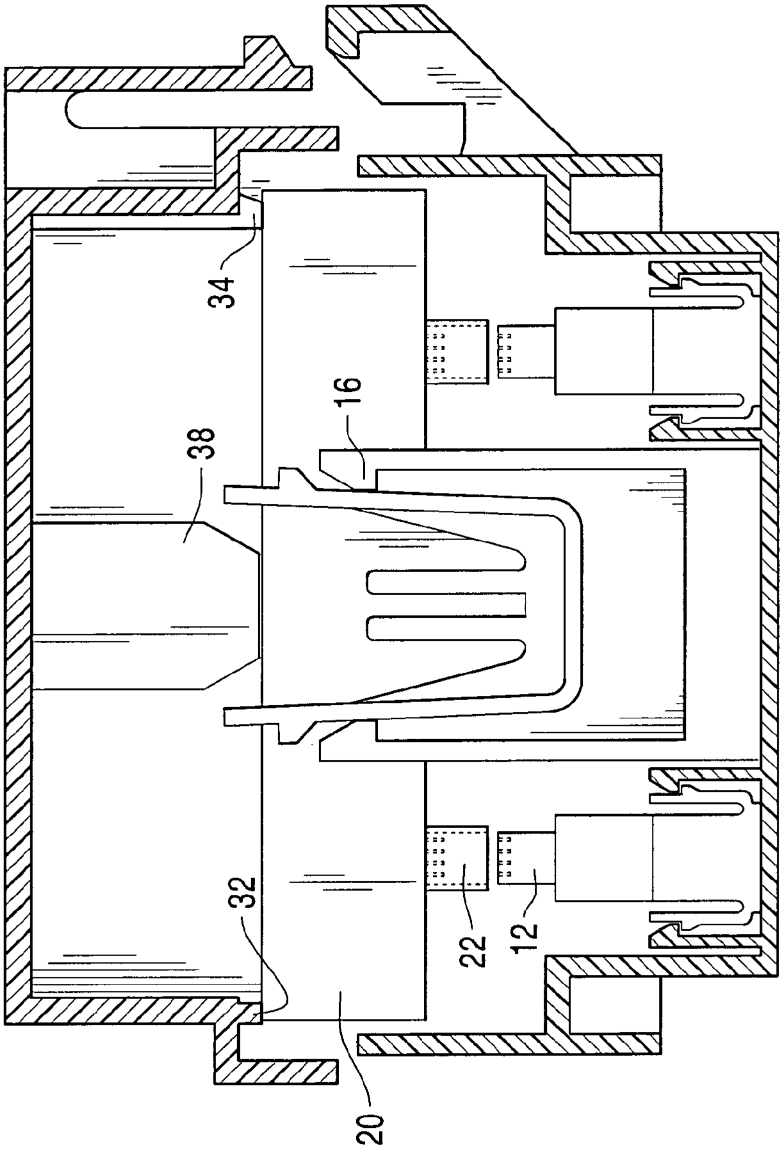
FIG. 2 illustrates a state in which the upper cover is brought into contact with the junction box.

FIG. 2 illustrates a state in which the upper cover 30 is brought into contact with the junction box 20. Because the junction box 20 has not yet been installed in the lower cover 10, the upper cover 30 does not engage the lower cover 10.

Figure 3:
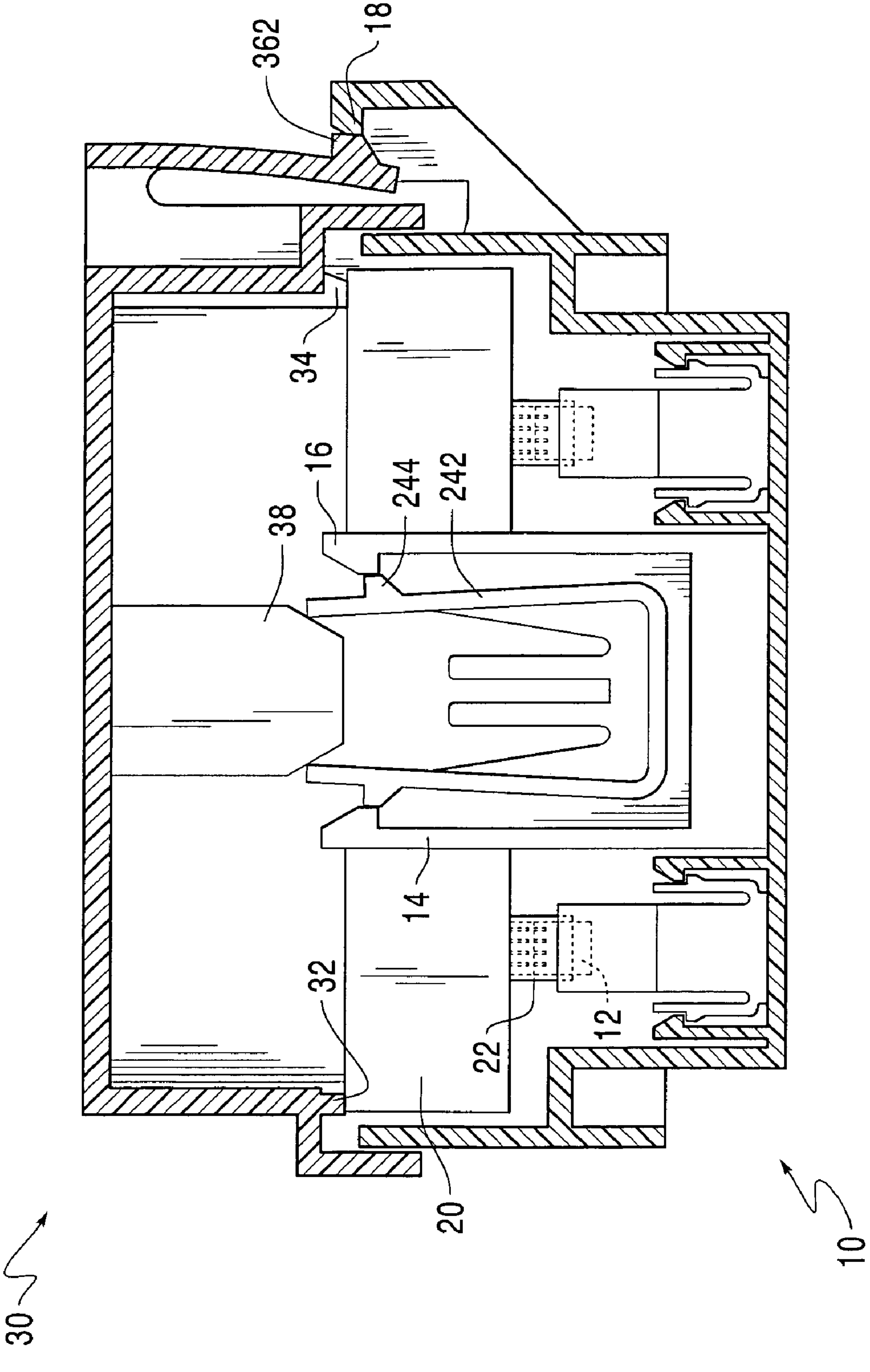
FIG. 3 illustrates a state in which the junction box is incompletely inserted into the lower cover, and the upper cover is restricted from being engaged with the lower cover.

FIG. 3 illustrates a state in which the junction box 20 is incompletely inserted into the lower cover 10, and the connectors 22 are only partially mated with the connectors 12. In this state, the locking arms 242 of the junction box 20 are deflected inward towards each other to a point of maximum deflection. The tab 38 has a width that is greater than a distance between the free ends of the locking arms 242, that is, the cover engagement restriction portions 246, at the point of maximum deflection of the locking arms 242. Therefore, in this state, the tab 38 abuts against the cover engagement restriction portions 242 and restricts the upper cover 30 from fully engaging the lower cover 10. Therefore, the locking element 362 of the upper cover 30 cannot engage the locking structure 18 of the lower cover 10. Advantageously, this state results in feedback to the assembly operator, alerting the operator that the junction box 20 has not been properly installed. The feedback may be visual, tactile or audible, or any combination of these.

The visual feedback may simply be in the form of a visual observation that the upper cover 30 is not fitting properly on the lower cover 10. The tactile feedback may be a tactile sensation that the upper cover 30 is not fitting properly on the lower cover 10, and/or a tactile perception of the absence of a "click" feeling that should happen when everything is properly engaged and the locking arms snap into place. The audible feedback may be a perception of the absence of a "click" sound that should happen when everything is properly engaged and the locking arms snap into place.

Figure 4:
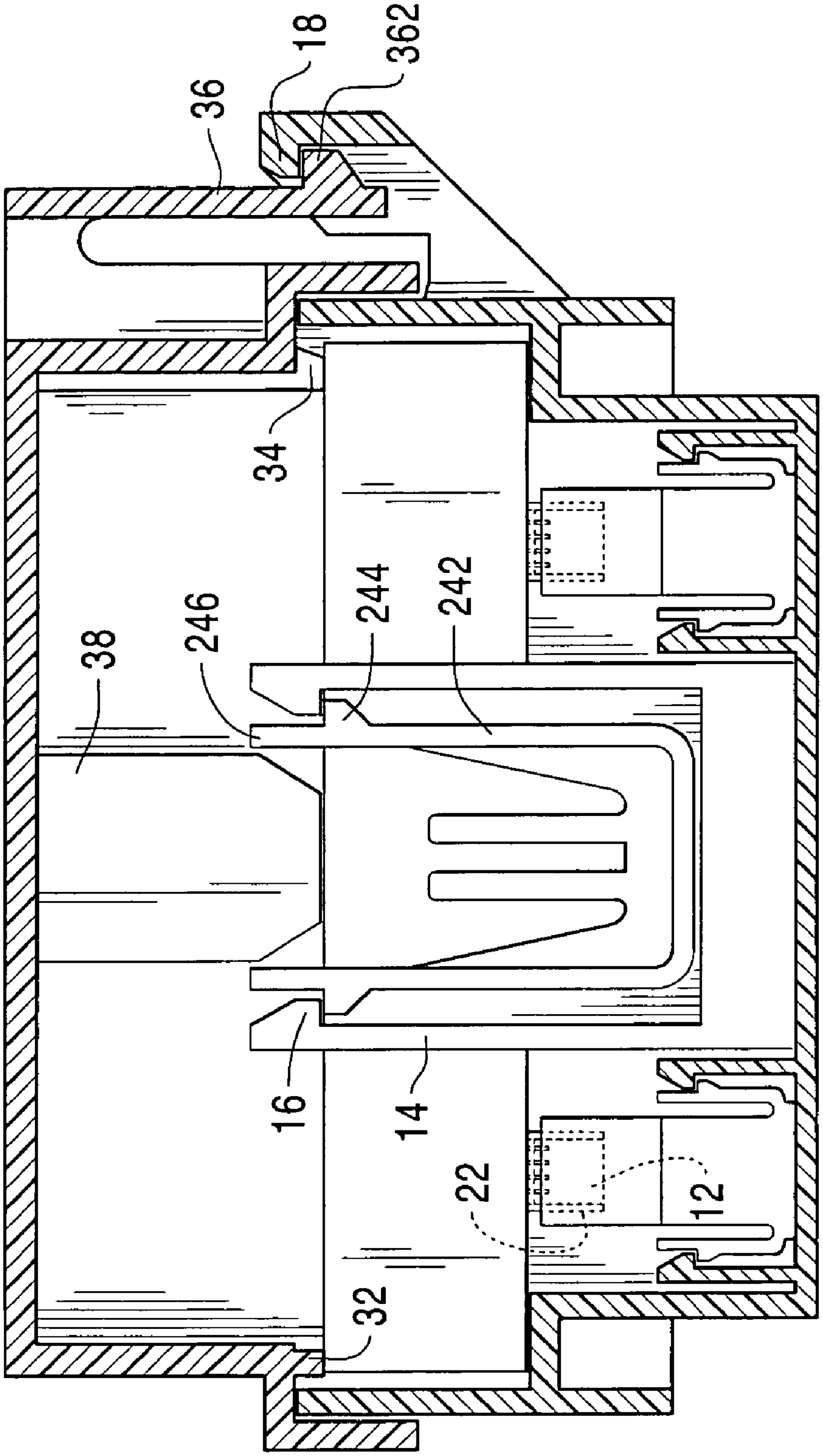
FIG. 4 illustrates a state in which the lower cover, the junction box and the upper cover are fully assembled.

FIG. 4 illustrates a state in which the lower cover 10, the junction box 20 and the upper cover 30 are fully assembled, and the connectors 22 are completely mated with the connectors 12. Because the junction box 20 is properly installed in the lower cover 10, the locking arms 242 deflect outward against the locking arms 14, so that the locking projections 244 engage the locking projections 16. The tab 38 can therefore fit between the cover engagement restriction portions 246, and the locking element 362 of the upper cover 30 can engage the locking structure 18 of the lower cover 10. The disconnection restriction portions 32 and 34 contact or are closely adjacent to the junction box 20, helping to restrict the junction box 20 from disengaging the lower cover 10.

The width of the tab 38 is great enough to restrict the cover engagement restriction portions 246 from deflecting inward to a degree that the locking projections 244 could disengage the locking projections 16. Therefore, the junction box 20 cannot be disengaged from the lower cover 10 until the upper cover 30 is removed, and accidental disengagement of the junction box 20 is thereby avoided. Additionally, a distal end of the tab 38 is preferably tapered, as shown in the drawings, to help guide the tab 38 into its proper position and thereby make assembly easier. The tapered end of the tab 38 can also, by pushing against the cover engagement restriction portions 246, help push the locking projections 244 into engagement with the locking projections 16. This feature is particularly useful if, for example, there is a slight amount of friction between the locking projections 244 and the locking projections 16 that prevents the locking arms 242 from deflecting outward to the fully locked position on their own.

Figure 5:
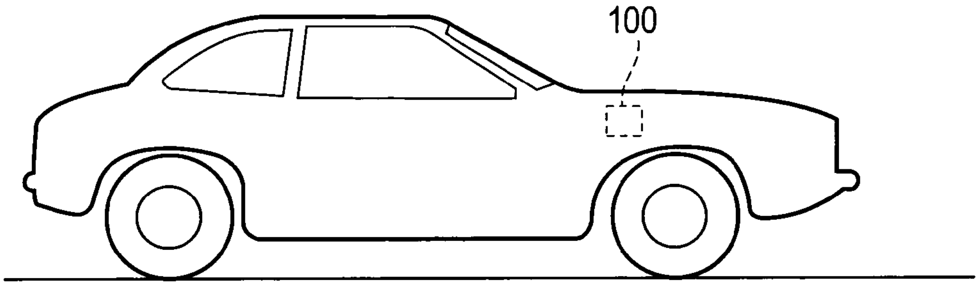
FIG. 5 illustrates a vehicle in which is mounted the junction box assembly of FIGS. 1–4.

FIG. 5 illustrates a vehicle in which is mounted the junction box assembly 100.

While the invention has been described in conjunction with specific embodiments, these embodiments should be viewed as illustrative and not limiting. Various changes, substitutes, improvements or the like are possible within the spirit and scope of the invention.

What is claimed is:

1. A junction box assembly, comprising:

a lower cover that holds one or more first connectors, the lower cover including one or more first locking structures;

a junction box that holds one or more second connectors that mate with the one or more first connectors, the junction box including one or more second locking structures that engage with the first locking structures when the first and second connectors are fully mated, the junction box also including one or more cover engagement restriction portions; and an upper cover that covers and engages the lower cover, the upper cover including one or more lock position assurance devices that abut against the cover engagement restriction portions and restrict the upper cover from fully engaging the lower cover if the first and second locking structures are not fully engaged.

2. The junction box assembly of claim 1, wherein, in a state of full engagement between the junction box and the lower cover, the lock position assurance devices restrict the second locking structures from disengaging the first locking structures.

3. The junction box assembly of claim 2, wherein:

the first locking structures each comprise first locking arms;

the second locking structures each comprise second locking arms that deflect inward to fit between the first locking arms, free ends of the second locking arms constituting the cover engagement restriction portions; and the lock position assurance devices each comprise a tab, the tab having a width that allows the tab to fit between the second locking arms if the second locking arms are in a fully inserted position.

4. The junction box assembly of claim 3, wherein:

during insertion between the first locking arms, the second locking arms deflect inward towards each other to a point of maximum deflection, and subsequently deflect outward away from each other as the second locking arms reach the fully inserted position; and the width of the tab is greater than a distance between the free ends of the second locking arms at the point of maximum deflection.

5. The junction box assembly of claim 3, wherein a distal end of the tab is tapered.

6. The junction box assembly of claim 1, further comprising one or more disconnection restriction portions provided on the upper cover, the disconnection restriction portions contacting or being closely adjacent to the junction box in a state in which the lower cover, the junction box and the upper cover are fully assembled.

7. A vehicle in which is mounted the junction box assembly of claim 1.

* * * * *